United States Patent
Dave et al.

(10) Patent No.: US 9,080,877 B2
(45) Date of Patent: Jul. 14, 2015

(54) CUSTOMIZING DESTINATION IMAGES WHILE REACHING TOWARDS A DESIRED TASK

(71) Applicant: Apple Inc., Cupertino, CA (US)

(72) Inventors: Swapnil R. Dave, Santa Clara, CA (US); Anthony L Larson, Santa Clara, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/773,439

(22) Filed: Feb. 21, 2013

(65) Prior Publication Data
US 2014/0236468 A1 Aug. 21, 2014

(51) Int. Cl.
| | |
|---|---|
| G05D 1/02 | (2006.01) |
| G06K 9/00 | (2006.01) |
| G09G 5/00 | (2006.01) |
| G01C 21/20 | (2006.01) |
| G01C 21/36 | (2006.01) |
| G06F 3/048 | (2013.01) |
| H04W 4/02 | (2009.01) |

(52) U.S. Cl.
CPC ............ *G01C 21/20* (2013.01); *G01C 21/3647* (2013.01); *G01C 21/3679* (2013.01); *G06F 3/048* (2013.01); *H04W 4/028* (2013.01)

(58) Field of Classification Search
USPC ............ 701/300, 533; 382/113, 306; 455/457
See application file for complete search history.

(56) References Cited

U.S. PATENT DOCUMENTS

| | | | | |
|---|---|---|---|---|
| 6,904,160 | B2* | 6/2005 | Burgess | 382/113 |
| 8,060,399 | B2 | 11/2011 | Ullah | |
| 8,244,454 | B2* | 8/2012 | Tertoolen | 701/532 |
| 8,364,397 | B2* | 1/2013 | Hamilton et al. | 701/436 |
| 2008/0027635 | A1 | 1/2008 | Tengler et al. | |
| 2008/0070593 | A1* | 3/2008 | Altman et al. | 455/457 |
| 2009/0171564 | A1* | 7/2009 | Wu et al. | 701/201 |
| 2009/0177383 | A1* | 7/2009 | Tertoolen | 701/208 |
| 2009/0324137 | A1* | 12/2009 | Stallings et al. | 382/306 |
| 2010/0273463 | A1 | 10/2010 | Bonnefoy et al. | |
| 2011/0141141 | A1* | 6/2011 | Kankainen | 345/632 |
| 2012/0221687 | A1* | 8/2012 | Hunter et al. | 709/219 |

FOREIGN PATENT DOCUMENTS

JP 2010266410 A * 11/2010

* cited by examiner

*Primary Examiner* — Thomas G Black
*Assistant Examiner* — Tyler Paige
(74) *Attorney, Agent, or Firm* — Kilpatrick Townsend & Stockton LLP (57) ABSTRACT

Customized images can be used to improve navigation of a user to a particular destination. For example, a mobile device can receive a first destination location of the first user. Additionally, the mobile device can receive one or more media files of the first destination location, wherein at least one of the media files is created with a recording device. Furthermore, the mobile device can further receive an indicator associating the one or more media files with the first destination location. Subsequently, the mobile device can receive a current location of the mobile device of the first user. Finally, the mobile device can display the one or more media files when the current location is within a specified distance of the first destination location.

25 Claims, 6 Drawing Sheets

CUSTOMIZING DESTINATION IMAGES WHILE REACHING TOWARDS A DESIRED TASK

BACKGROUND

Aspects of the disclosure relate to computing technologies, including computer software and computer hardware. In particular, various aspects of the disclosure relate to using a navigation application in a mobile device to help a user arrive at a particular destination.

In navigation, a user can input a particular destination into a navigation application, and obtain turn-by-turn directions to the particular destination. In some instances, when a user arrives at the particular destination (e.g., as directed by a navigation application), the user may not know what the destination looks like, thus causing the user to be disoriented.

While such navigation applications are useful in guiding the user to the particular destination, the user's lack of knowledge regarding the particular destination can result in the user not easily finding the particular destination. For example, if the user is traveling to a restaurant, the user may not know what the entrance of the restaurant looks like or where the closest parking lot is located.

Current implementations of some User Interfaces (UIs) can provide images of destinations provided by the creator of a map application. A user may get a feel of how a destination looks prior to reaching a place. However with current implementations, the images are pre-chosen by a third party. For instance, images may be taken by vehicles owned by the creator of the map application. Furthermore, the images may not be up-to-date and may lack the personal touch that a user may be seeking.

Therefore, it is desirable to provide methods and devices that provide for easier navigation to a particular destination that may be unknown to a user for a better user-experience.

DETAILED DESCRIPTION

Aspects of the disclosure relate to the use of customized media files (e.g., images) with associated location tagging to improve navigation to a destination. For example, a first user can capture image(s) using a camera and associate a location with each image. The first user can tag the image(s) with geographical location data. The image(s) can be stored on a mobile device or uploaded on a server (e.g., iCloud). The image(s) can be displayed on the mobile device of a second user, once the second user is within a specific distance of the destination.

In one embodiment, the first user can transmit the image(s) to a second user, once the second user is close to the destination. In another embodiment, the second user can download the image(s) from the server, once the second user is close to the destination.

The image(s) can provide additional user-customized information about a location, which can help faciliate the second user reach the destination. For example, once the second user is within a mile of the house of the first user, the image(s) that are associated with the house can be displayed on the navigation application of the second user.

According to various embodiments, a first user can associate media files with their corresponding destination address (e.g., restaurant, home) and upload these customized media files associated with the destination (e.g., driveway, guest parking, unique home identifier, pictures of restaurant, video, slideshow, audio tour) on a server (e.g., iCloud). A second user can receive the media files based on timing and/or proximity to the associated location. In some instances, when a user enters a geo-fence corresponding to a location, the media files associated with the location are automatically displayed to the user. For example, when a second user inputs the destination address on the navigation application, the system can trigger the creation of a geo-fence around the destination address. When the guest reaches the geo-fence, the images can be displayed to the user.

According to some embodiments, the media files can be stored in a server (e.g., iCloud), mobile device, or other devices. For example, the media files can be stored on a server and transmitted to a user close to the associated location. In another example, the media files can be previously stored in the device of the user traveling to the destination. According to another embodiment, the images can be sent to the second user by the first user, once the second user has reached the location associated with the customized images tagged by user A.

According to some embodiments, the media files can be pre-authorized for sharing. In some instances, the system can be implemented so that permission is needed by the first user before the media files can be downloaded by or transmitted to the second user. For example, the UI can allow a first user to select specific contacts to have access to a photo album of the first user; therefore when these specific contacts approach a location associated with the media files, the media files can automatically be transferred without additional action from the first user.

Furthermore, the destination can be a final destination or simply one point along a route. For instance, the system may have multiple points along the route which have corresponding media files. Therefore, as the second user reaches each geo-fence, the second user is displayed one or more media files for the corresponding location. For example, the navigation system can display multiple user-uploaded customized images for each turn along a route (e.g., user is requested to turn right after seeing a gas station that correspond to the displayed image).

I. Associated Location Information with Media Files

Figure 1A:
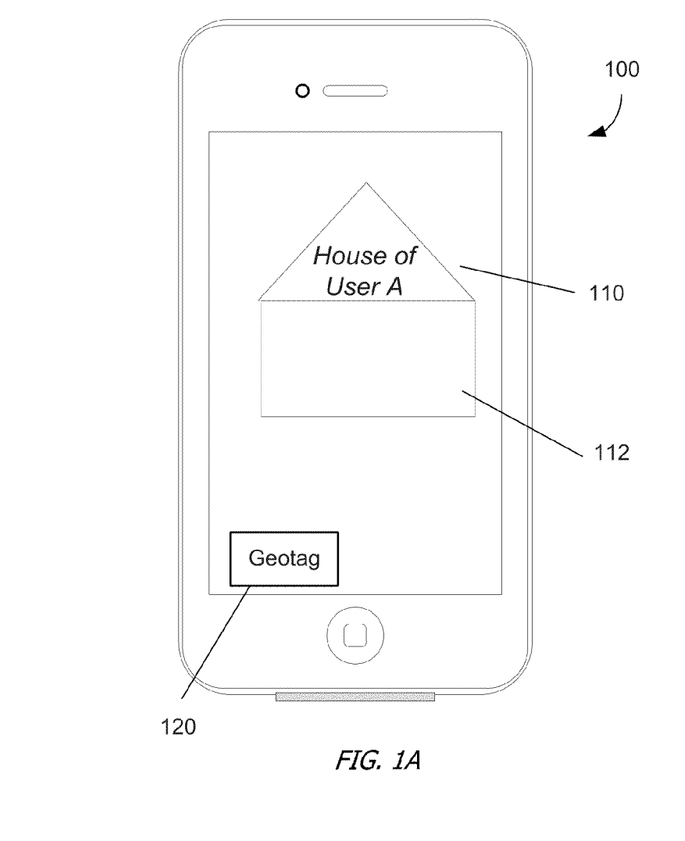
FIG. 1A shows a mobile device with a user interface to create a customized destination image according to embodiments of the present invention.

FIG. 1A shows a mobile device 100 with a user interface to create media files and associate location information according to embodiments of the present invention. Mobile device 100 shows an image 110 from a media file (e.g., a photograph, a video). More than one image may be shown, e.g., in a tiled display. Image 110 may be displayed just after image 110 was captured using a camera of mobile device 100. In another implementation, image 110 may be displayed in response to a user selecting image 110 from a set of images, e.g., by browsing the set of images and selecting the desired image(s). Mobile device 100 can have a camera function to capture an image 110, e.g., as a photo or a video.

As shown, image 110 is of a front view of the house of user A 112 that has the text "House of User A" near the top of the building. User A might take this photo so that future guests can easily find the correct house, when visiting user A.

As part of displaying image 110, a user input object 120 (e.g., a button, icon, or link) can be displayed to allow a user to associate a location corresponding to the image 110. User input object 120 can have a graphical shape and label to indicate a geotagging function is associated with the user input object 120. As another example, user input object 120 could include text to indicate a geotagging and/or location tagging function. In another implementation, user input object 120 can also be a voice-activated object. Instead of displaying an option on a screen with the image, other embodiments can display a prompt on a screen by itself or with other options from the camera. For example, the prompt might ask "Do you want to associate your photo with a location?"

In one embodiment, after the user captures or selects a media file, a location can be detected corresponding to the location of the media file. The location can be provided based on the global positioning system (GPS) coordinate of the mobile device. In another example, the location can be provided using location assistance data. Furthermore, the user does not have to enter the location, but the mobile device (or a server connected to the phone) can automatically determine the current location of the mobile device. Thus, someone can associate a location to a media file by simply tagging the media file with the current location of the mobile device. The location can also be used to tag a point-of-interest (POI) (e.g., store, restaurant) to the media file. For example, this can allow the user to simply take a photo that has an associated location pre-determined by the mobile device to simplify the process to the user.

As an example, a user could take an image (e.g., a picture) of his/her house, which implicates GPS to obtain a location of the mobile device. The mobile device can use GPS (or other method) to obtain the location and display the acquired location to the user. A database can be accessed to determine that the location is associated with POI. The user can then select an option to tag the location of the captured image. Additionally, the user can associate the captured image to a photo album or a contact list.

Figure 1B:
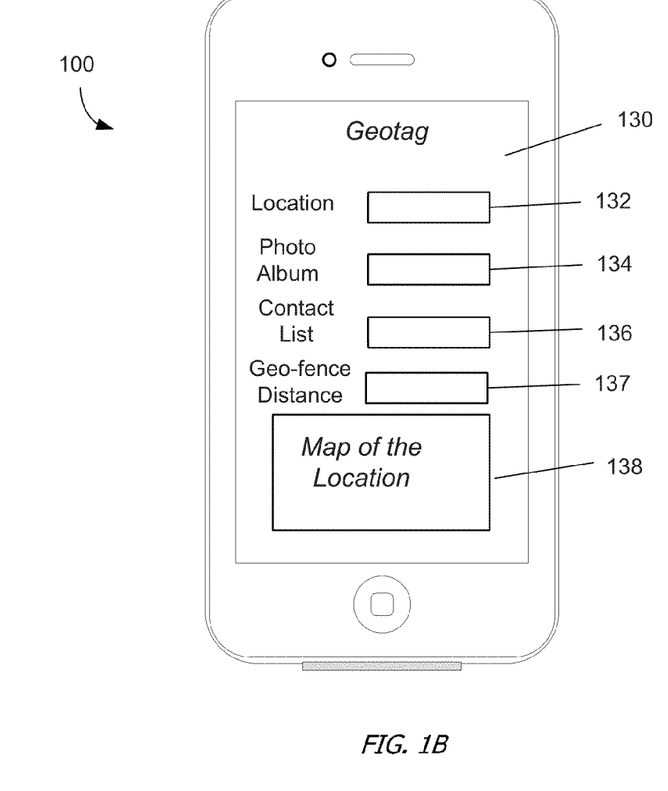
FIG. 1B shows a mobile device displaying a screen for entering location information to the customized destination image according to embodiments of the present invention.

FIG. 1B shows mobile device 100 displaying a screen 130 for entering a location corresponding to a media file according to embodiments of the present invention. In one embodiment, screen 130 can be displayed after the user selects user input object 120 for creating customizing destination media files. Screen 130 allows a user to specify information for tagging the media file to a corresponding location, such as, but not limited to, a box 132 for a location, a box 134 for a photo album, a box 136 for a contact list and a box for a geo-fence distance 137. In an example of FIG. 1A where the image is a photo of the front of the house of user A, the user may want to tag the location of the image with his/her home address in box 132.

In various embodiments, boxes 132, 134, 136 and 137 can be used by the user to associate metadata with the media file. In one implementation, only the location is sufficient to specify the customized location image, where a default location can be used (e.g., GPS location of the mobile device). A map of the location 138, which corresponds to the location listed in box 132, can be displayed to help the user better determine the location.

Boxes 132, 134, 136 and 137 can be displayed at the same time, or options can be selected for determining which boxes to display (e.g., just one of boxes 132, 134, 136 and 137 or two of them). One implementation can provide any combination of the fields in boxes 132-136 or other user interface to enter the location. Such fields can be input by using a keyboard from a touch screen, entered by voice, etc.

Figure 1C:
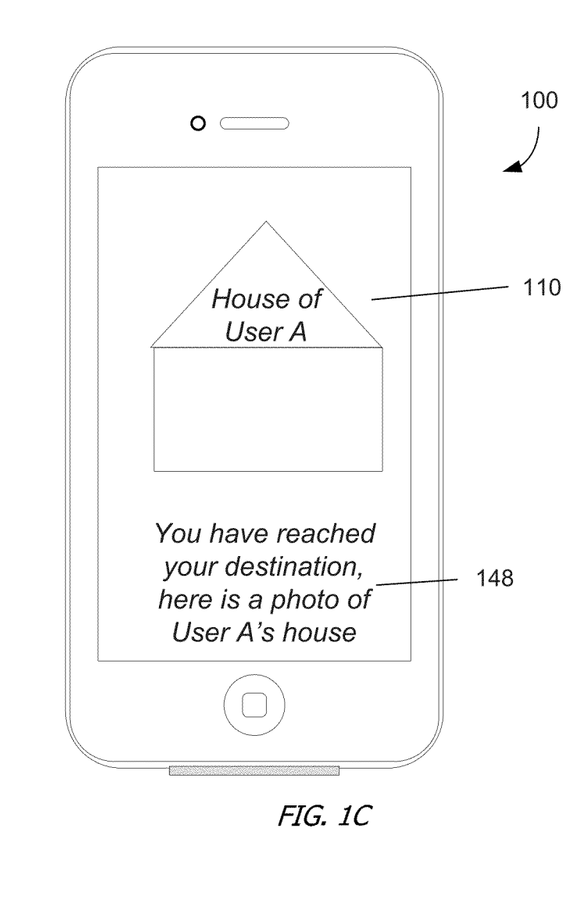
FIG. 1C shows a mobile device displaying the customized destination image with a message when a user has reached the destination according to embodiments of the present invention.

FIG. 1C shows mobile device 100 displaying image 110 with a message 148 when a user has reached the location associated with the media file according to embodiments of the present invention. In this manner, image 110 can be provided to the user to facilitate the user in finding the accurate destination. For example, the image 110 and a message 138 can be provided to perhaps indicate where to go, as the user may use the visual and/or audio information to determine the destination. In some embodiments, the media file can be an image 110, a video, a slide show, or an audio recording.

In the example of FIG. 1A, the location tagging is initiated after image 110 was already taken. However, in other embodiments, the location tagging can be done before image 110 is taken. For example, the location tagging can be done before the capturing of the image through various mechanisms, e.g., voice, text from a keyboard, selecting an icon or button, etc. In such an embodiment, a camera function can be activated as one step of the process that is initiated in response to the user request.

Figure 1D:
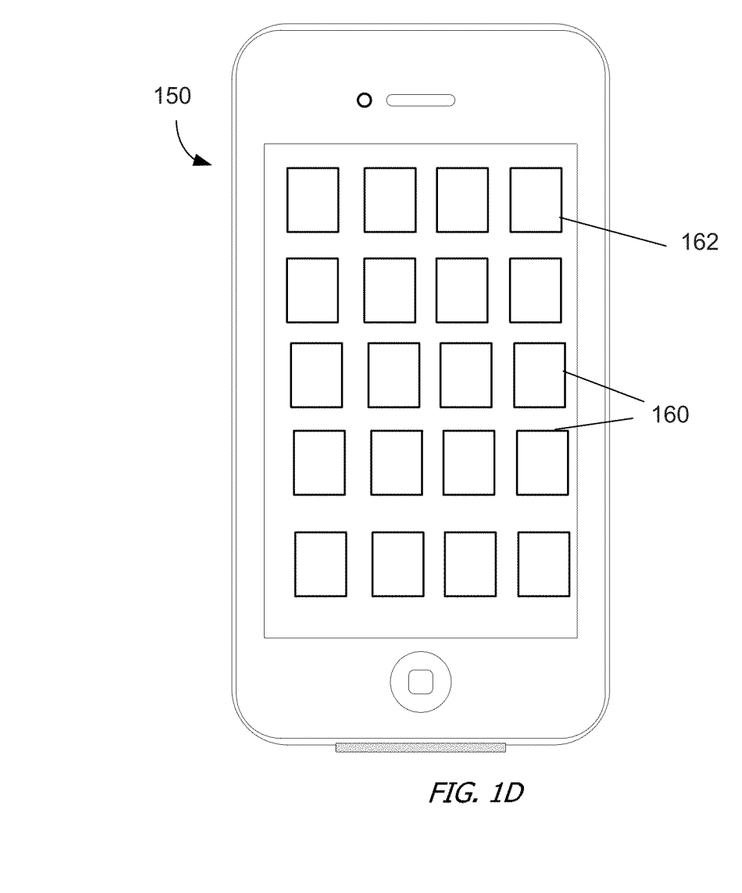
FIG. 1D shows a mobile device 150 displaying icons for applications ("apps") 160 where one app 162 is a customized destination image app according to embodiments of the present invention.

FIG. 1D shows a mobile device 150 displaying icons for applications ("apps") 160 where one app 162 is a customized location media file app according to embodiments of the present invention. In one embodiment, the selection of app 162 can act as a user request to create a media file with an associated location. Once selected, app 162 can provide a screen to enter information (e.g., as in screen 130) and provide a camera function to capture images, where such screens can occur in any order.

For example, in response to the selection of app 162, app 162 can open to a camera function, which can use a camera of mobile device 150. Since the camera was opened via app 162, mobile device 162 can automatically create a media file with an associated location using a media file subsequently captured with camera. In another implementation, before going to the camera function, the screen 130 of FIG. 1B can be displayed to provide information for creating the media file with an associated location. Once the information has been provided, app 162 can automatically go to the camera, or move to the camera in response to a user request selected from within app 162.

A. Customized Media Files

Current navigation applications simply prompt a user that the destination has been reached. The voice prompt is static, and there is nothing dynamic occurring once the destination has been reached.

Furthermore, current navigation applications can have destination of images available, but these images are static. For example, a user can retrieve images of a destination (e.g., a restaurant) from third-party websites (e.g., Yelp), but these images are static and not customizable. Therefore a current navigation application can potentially interface with a third party server to obtain generic images of the destination. However, for example, the owner of the restaurant cannot upload and does not have control of the images to the navigation server for customers to view, when the customer is requesting directions to the restaurant.

Additionally, in current implementations, the images corresponding to the home of a user are static. For example, the images can be gathered by a third-party (e.g., Google satellite imaging), and these images may be outdated and not customizable. According to some embodiments of the present invention, a home owner can determine the media files that should be associated with his/her home.

Unlike static images uploaded to a third-party server (e.g., Yelp), embodiments of the present invention may allow a user (e.g., owner of the restaurant) to determine the media files (e.g., images of the restaurant) to be displayed to another user, as the other user reaches the destination (e.g., restaurant). Additionally, some embodiments of the present invention call for the ability of a user to have control over when, and how, and where those photos are actually displayed.

According to some embodiments of the present invention, the media files can be associated with an address. For example, in a vCard, a user can include his/her home address. Therefore, according to some embodiments, a user can store media files that the user may want to associate with his/her home address.

According to another embodiment, when a user captures an image using a mobile device, the image can contain metadata. For example, the metadata can include geo-tagging of the location of the mobile device when the image is captured. Therefore, in some instances, when a user updates his/her vCard with his/her home address, the graphical user interface (GUI) can suggest images that are associated with the home address based on the geo-tagging information of the image.

According to another embodiment, when the image is captured, the UI can request user permission to associate the image with a corresponding location. For example, a user can tag certain photos by adding the photos to a contact. In another example, the GUI can display a button that allows the user to add a photo to a corresponding location based on the geotagging information of the photo. Therefore, in some instances, when a user sends the location of a destination to another user, the associated images with the location can also be sent seamlessly and without further user interaction.

According to some embodiments, geotagging a photo can mean tagging the latitudinal and longitudinal coordinates of the location at which the photograph was taken in the photograph's metadata. In some instances, this feature is performed automatically by the mobile device so long as the location services (e.g., application that allows location to be associated with images) of the device and the location services of the camera are enabled.

For example, a user can live in an apartment complex and with a complicated parking situation. According to some embodiments, a user living in the apartment complex can send a contact or a point to a friend which can also include direction and media files. Therefore in addition to receiving the apartment location, the friend can also receive images (e.g., sign post for where the parking lot is located) to help better locate the parking lot. For example, the friend may have to go around back, a side street, and several pictures automatically get displayed at specific times and/or locations on the device of the friend.

B. Transmitting the Media Files to a User

According to some embodiments, the mobile device of the first user can have the ability to send media files (e.g., images) to the mobile device of the second user using different methods. For example, the mobile device of the first user can send the media files to the second user along with the address of the location; can upload the media files to a server (e.g., iCloud); or can store the media files to be sent at a later time.

For example, different parts of the one or more media files can be stored on different devices (e.g., device of first user, server, device of second user). For example, part of the media files can be stored on the server (iCloud) and part of the media files can be stored on the device of the first and second users.

In some instances, when a first user sends his/her contact information to a second user, the contact information can contain the home address of the first user. In addition to the home address, the contact information can contain media files (e.g., pictures) corresponding to the home address. Therefore, in some instances, when the second user arrives at the home address, the media files can be displayed. According to some embodiments, the media files corresponding to the home address can be generated and/or captured by the first user.

In one aspect, the transmitting and receiving devices can be implemented with the same protocol. In some instances, both devices may know the location of each other. In this example, the media files can be transmitted by the transmitting device once the transmitting device can determine that the receiving device is at or near the destination.

Additionally, the transmission can be customizable by either the receiving or transmitting user. Alternatively, the users can decide to use the default settings (e.g., existing schematics) of the navigation system. For example, a UI can request the user for customized settings or use the existing schematics.

Furthermore, the media files can be updated on the server by the user. For example this user can create the media file and upload the media file into his/her cloud storage. However, the media files are only sent to other users once the other users approach the destination location. Therefore, in some instances, the other users are not notified of the updated media files until the time when the other users actually enter the geofence of the destination location. This can allow for a reduction of notification and updates, as opposed to receiving an update every time a new media file has been uploaded on the server.

C. Storing the Customized Media Files

According to one embodiment, the media files can be stored in the mobile device of the user. In this implementation, the media files can be transferred to another user along with the transfer of the contact information. Alternatively, the media files can be transferred to another user, once the user is within the geofence associated with the location. In other embodiments, the media files can be transferred any time between the time when the image was originally captured and when a user arrives at the destination.

According to another embodiment, the media files can be stored on a server. For example, the media files can be transferred to a server from the mobile device of the user, and stored on the server. In some instances, the server can be a personal storage device of the user, such as a personal account of the user. A cloud-based service can give a user the ability to manage his/her storage by controlling his/her device backups and determining which media files to store in the cloud. In the case where the mobile device of the user is off, the media files can still be transferred using the server or cloud storage implementation.

According to another embodiment, a percentage of the media files can be stored in one or more mobile device, and the remaining percentage of the media files can be stored on a server. For example, the actual image files can be stored on the cloud, while the contact information (e.g., home address) and access right to the cloud storage of the user (e.g., digital certificate) can be stored in one or more mobile devices (e.g., a mobile device of a home user and guest). To illustrate this example, the guest and home user can both have access to a shared photo album from a previous interaction. Therefore, when a home user transfers to the guest his contact information with his home address, the contact information can also include a pointer to a home photo stored in the shared photo album.

Furthermore, one or more images can be stored in a memory with an association to a location. The memory can be on the mobile device or be a memory of a server, which is in communication with the mobile device. Regardless of where the memory resides, a storage controller of the mobile device can access the memory to retrieve the images and the location.

In one embodiment, the image and the location can be stored as an object, e.g., a database object. The object could have predetermined fields, e.g., a pointer to the image(s), a field for the time period, a character field for the message, and fields for any other information that is used as part of the navigation application. Thus, the images can be stored associated with a pointer or other reference that identifies the one or more images in memory. This data can be retrieved in response to a user reaching a destination.

D. Pre-Authorization

According to some embodiments, a pre-authorization process can allow a user to tag the media files with access rights and location (e.g., point-of-interest). For example, a user can manually tag photos as the home of the user. Additionally, the photos can be set to be shared with other specific users (e.g., from contact list) who are near a specific location.

According to another embodiment, the media files can directly be associated with a contact. For example, the user can drag-and-drop the media file to a contact in his/her contact list. In this instance, the contact can have pre-authorized access to the media file; therefore when the contact approaches the location associated with the media file, the media file can be transmitted to the contact.

According to another embodiment, the media files can be stored on a server (e.g., iCloud), and users with pre-authorized access to the media files can automatically receive the media files, regardless of the mobile device being switched on/off.

Figure 2:
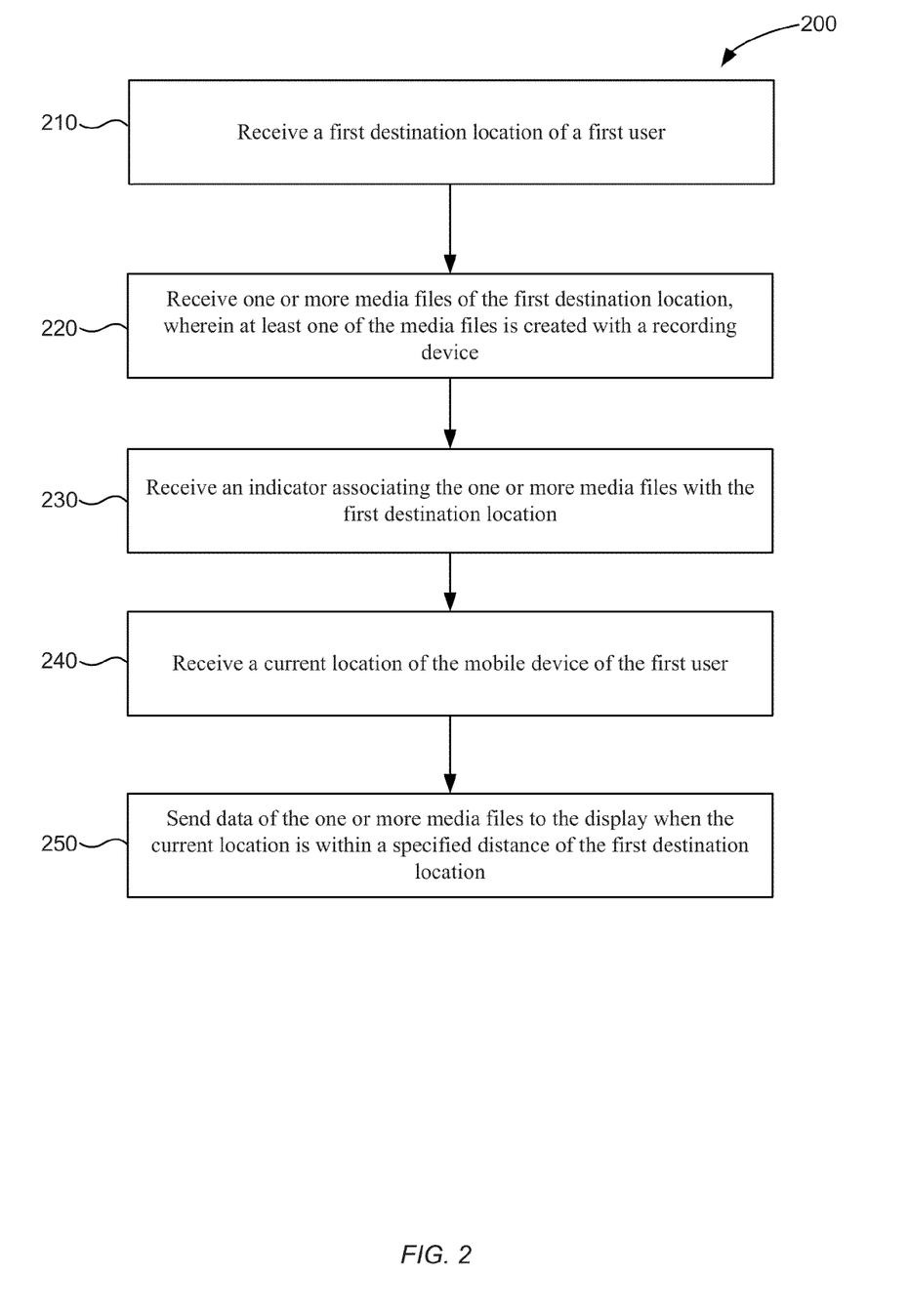
FIG. 2 is a flowchart illustrating a method 200 for providing customized destination images according to embodiments of the present invention.

II. Providing Customizing Destination Media Files while Reaching a Desired Location FIG. 2 is a flowchart illustrating a method 200 for providing customizing destination media files while reaching a desired location according to embodiments of the present invention.

At block 210, a mobile device can receive a first destination location of the first user. The first destination location can include a geographic location (e.g., GPS coordinates), which may be provided in any suitable manner, e.g., as described herein. For, example the first destination location of the first user can be received via an SMS message or other sharing mechanisms. As detailed above, the first destination location can be received by selecting a customized location media file app. The mere selection of the app can be used as a user request to receive a first destination location. The user request can be received as any type of user input, e.g., by selection on a touch screen, using a pointer device, entering text, or via voice. The user request can include a message and other information, and may occur at various points in time relative to other blocks of method 200.

At block 220, the mobile device can receive one or more media files of the first destination location, wherein at least one of the media files is created with a recording device. The mobile device can include a camera having a lens and an image processor for capturing the one or more media files and digitizing the media files. The one or more images can be a photograph, series of photos, or a video, which can also have associated audio.

The media files can be captured in conjunction with tagging the associated location of the media files in various ways. In one embodiment, the mobile device can determine the location of the captured media file and tag the determined location associated with the media files. In another embodiment, the user can input the destination location of the media file. For example, a user input object (e.g., a button) can be displayed when the photo appears after the image is being taken. Further, the user can input the destination location as illustrated in FIG. 1C.

At block 230, the mobile device can receive an indicator associating the one or more media files with the first destination location. The indication can be used by the mobile device to associate the one or more media files with the first destination location. In some instances, the media files can have metadata that includes geolocation data. For example, a media file (e.g., photo) taken with an iPhone can include embedded GPS and geolocation data. The GPS data about the media file can include the altitude, the altitude reference, degree of precision (e.g., accuracy), the latitude, longitude, and time stamp. The location can be the location of the mobile device when the one or more images are captured, and thus the location should effectively correspond with the location of the object in the image. The location can be detected with various techniques, e.g., using GPS or via a network connection.

As mentioned, the location can be detected in response to the image being taken. For example, when the camera function is initiated, the mobile device can be configured to detect the current location of the mobile device when the image is taken. These two functions can be taken contemporaneously in that both functions can operate at the same time or within close proximity in time, e.g., as part of a series of steps in response to one action by the user. In another embodiment, the user request is received after the image is already taken, and the location can be detected at that time. For instance, in FIG. 1A, the user selection of user input object 120 can cause the location to be detected.

Some embodiments do not automatically detect location. As one example, the user can specify the location, e.g., by dropping a pin. Regardless of the mechanism for detecting location, the capturing of the image(s) can be first, followed by the user request or the location detection; or the user request can be received first followed by the capturing or the location detection.

At block 240, the mobile device can receive a current location of the mobile device of the first user. As mentioned, the current location can be detected with various techniques, e.g., using GPS or via a network connection.

At block 250, the mobile device can send data of the one or more media files to the display when the current location is within a specified distance of the first destination location. As illustrated in FIG. 1C, the mobile device can display the media file associated with a specific location, once a user is within a specific distance (e.g., geo-fence) of the specific location.

In some instances, the specific distance can be a default value (e.g., one mile). In other instances, the specific distance can be customizable by the user as illustrated by the geo-fence distance box 137 in FIG. 1B.

When the current location is within a specific distance of the destination location, a signal can be sent to a customized location media file app that can control the retrieval of images, location, and message, and subsequent actions. The signal can include an indicator corresponding to the media files saved in the customized location media file app. For example, the display trigger can be tied to the customized location media file app, which can access the current location of the mobile device using GPS and display media files associated with the current location of the mobile device.

In one implementation, the matching of the current location and the destination location can call a function that accesses the media files associated with the destination based on the received indicator, which contains or references the customized media files (i.e., the image(s), location, message, etc.). The routine can then retrieve the data of the media files in a prescribed order (which can vary depending on a default programming or a user input) for displaying.

For example, the media files displayed to the user can include the one or more images and optionally other associated data. In various embodiments, the media files can be displayed as a series (e.g., image(s), then location, then message) or displayed simultaneously. As another example, the location could be shown first, then the message, and then the image(s). The user can be provided with navigation tools to move between the different items. In another embodiment, some or all of data items could be provided in a single screen. For example, FIG. 1C shows the message and the image on the same screen. Thus, the user can get the customized media files associated with the destination location with useful details.

III. Displaying Customized Destination Images when User Reaches Destination

In addition to transmitting and receiving the media files, according to some embodiments of the present invention, the navigation application can automatically process and display the media files associated with a destination, once a user has entered a specific distance (e.g., geo-fence) associated with the destination.

In current systems, the user has to manually request the navigation application to retrieve the images from a third-party server. For example, once a user has input the destination address and the navigation application displays to the user the direction, then the user can optionally manually request images associated with the destination address. In contrast, some embodiments can send and display the media files without a user having to take an action to specifically request the media files.

Furthermore, other current systems can provide 3-D street view of the area, but the user needs to specifically request it. Furthermore, the street view can be out of date and is not customizable by the local user. In contrast, in some embodiments, a user can upload customized media files for a destination and not just rely on photos taken by a third party.

In contrast, according to some embodiments, a geo-fence trigger can exist around a specific location. In some instances, the geo-fence can be a default distance from the location. In other instances, the geo-fence can also be customizable by the user. When the location of a user is within the geo-fence, it can trigger the navigation system to display media files associated with the destination location.

According to some embodiments, the navigation system can dynamically display media files corresponding to a destination location, once a user has entered the geo-fence. According to one embodiment of the present invention, the navigation system can display an image corresponding to the destination location. Then, the navigation system can commence an automatic slide show of other images corresponding to the destination location, or alternatively a user can initiate the slide show by request.

In some instances, once a user arrives at the destination, the navigation application can help the user find a parking spot nearby. For example, once the user has arrived at the destination, the navigation system has the ability to display the surrounding area in a 360 degree view. In the 360 degree view, an indicator (e.g., flag) can be placed for places of potential interest (e.g., parking spot) to the user.

Additionally, once a user arrives at the destination, the navigation can place an indicator to the position of the destination (e.g., apartment entrance). In some instances, a photo of the destination (photo of the apartment building) can also be displayed.

Figure 3:
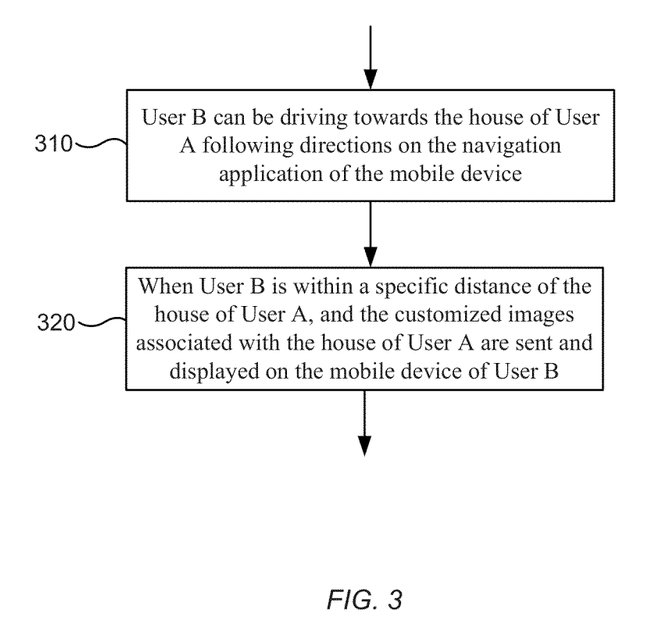
FIG. 3 shows an implementation for displaying customized destination images according to embodiments of the present invention.
Figure 4:
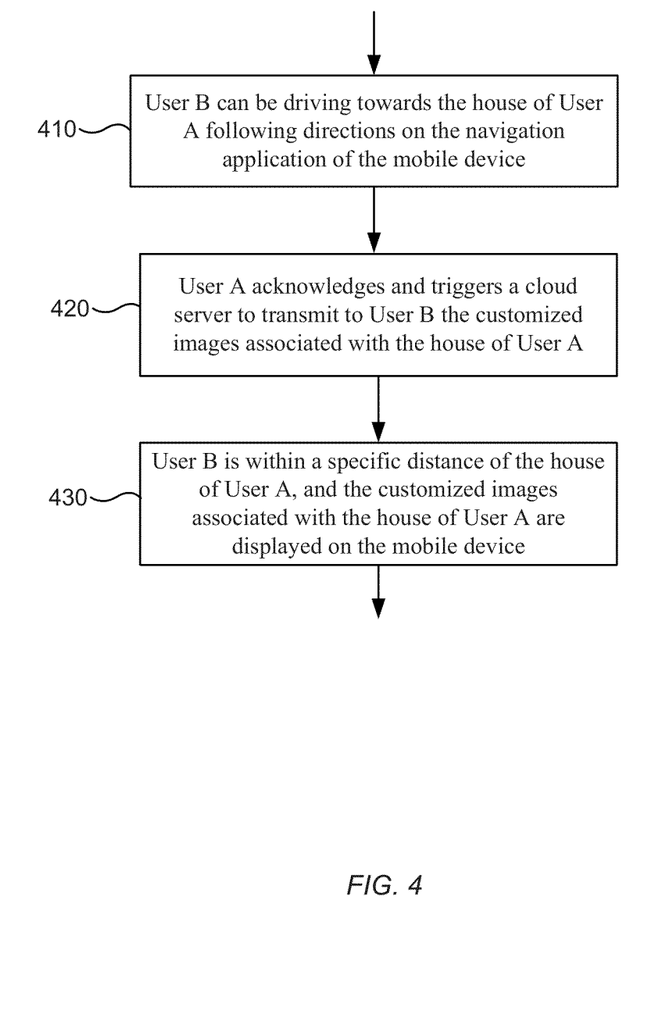
FIG. 4 shows another implementation for displaying customized destination images according to embodiments of the present invention.

FIGS. 3 and 4 illustrate implementations of displaying the customized destination images according to some embodiments of the present invention. For example, User B may want to visit User A and request User A for his house address. User A may have customized images of his/her house that User A wants to attach to the route map. The customizing destination image application can display these customized images of the house of User A, when User B approaches the house of User A.

According to some embodiments, User A can capture a customized image of his/her house and tags these images to be associated with his/her house. For example, as illustrated in FIG. 1B, User A may tag these customized images in a "My house" folder. Additionally, User A may attach the "My house" folder link in the business card sent to User B. Therefore, when User B requests the house address of User A, User A can send a business card which can have the house address typed in. Since User A can have tagged the images in the "My house" folder to the house address, the images can be sent to User B along with the house address.

FIG. 3 illustrates an implementation of displaying the customized destination images according to some embodiments of the present invention. In some instances, a geo-fence trigger can exist around a specific location. When the location of a user is within the geo-fence, it can trigger the navigation system to display media files associated with the destination location.

At block 310, User B can be driving towards the house of User A following directions on the navigation application of the mobile device. For example, User B can request the house address of User A. After receiving the house address, User B can input the house address in the navigation application to drive towards the house of User A.

At block 320, when User B is within a specific distance (e.g., geo-fence) of the house of User A, the customized images associated with the house of User A are sent and displayed on the mobile device of User B.

For example, the customized images can be the images stored in the previously mentioned "My house" folder. The mobile device of User A can transmit the customized images, once it is determined that the location of User B is within a specific distance of the house of User A.

In some instances, the navigation application can dynamically display media files corresponding to a destination location, once a user has entered the geo-fence Furthermore, once a user arrives at the destination, the navigation system can help the user find a parking spot nearby.

Additionally, once a user arrives at the destination, the navigation system can place an indicator to the position of the destination.

FIG. 4 illustrates another implementation of displaying the customized destination images according to some embodiments of the present invention.

In one embodiment, the mobile device of User B can notify the mobile device of User A that User B is within a specific distance of the house of User A. According to another embodiment, the mobile device of User A can monitor the location of User B based on location tracking (e.g., Find my Friend application).

At block 410, User B can be driving towards the house of User A following directions on the navigation application of the mobile device, similar to block 310.

At block 420, User A can acknowledge and trigger a cloud server to transmit to User B the customized images associated with the house of User A. For example, the customized images can be the images previously uploaded by User A to the cloud server in his/her "My house" folder.

At block 430, when User B is within a specific distance of the house of User A, the customized images associated with the house of User A are sent and displayed on the mobile device of User B, similar to block 320.

For example, the cloud server can transmit the customized images, once it is determined that the location of User B is within a specific distance of the house of User A.

In some instances, the mobile device of User B can notify the cloud server that User B is within a specific distance of the house of User A. In other instances, the cloud server can monitor the location of User B based on location tracking (e.g., Find my iPhone application).

In one embodiment, once a user enters the geo-fence associated with a location, the media files are displayed to the user. For example, a user is driving to the destination address entered in his/her navigation system, and when the user is close to the destination (e.g., within one mile), the media files are automatically displayed on the navigation system.

In another embodiment, the location of the user can be determined by certain applications (e.g., Find My iPhone, Find My Friends). For example, a user can be expecting a guest to arrive at the home of the user. In some instances, the user can be tracking and monitoring the directions of the guest. The user can be notified once a guest is nearby, in order for the user to send media files of the home. Alternatively, the media files can automatically be sent to the guest, once it is determined that the guest is near the destination.

In yet another embodiment, the server can determine the location of the user. In some instances, once the user enters the geo-fence, the server can be notified and begin transferring the media files to the mobile device of the user. For example, some images may be associated with locations, and, using the geotagging of the images, the server can be notified.

Furthermore, the mobile device of the user going to the destination can be notified that it has entered the geofence. Based on the positioning data, the navigation system can determine that the mobile device has entered the geofence associated with the location. In some instances, the notification and be a trigger for the navigation system to display the media files associated with the destination.

IV. Multiple Critical Points Along a Route to a Destination

According to some embodiments, the system can display media files (e.g., image of the exit ramp) during the turn-by-turn directions of a navigation system. For example, this embodiment may enhance a user-experience by automatically displaying an image of the exit ramp to the user, as the navigation system directs the user to take the exit ramp. These images and photos can give the user a feel for the road, instead of the customary two-dimensional map with a pin for the destination. For example, a user can see exactly what a given spot actually looks like.

According to some embodiments, the navigation system can incorporate algorithms which determine significant points along the road. These significant points can be event triggers to display media files to a user who approaches these significant points. The algorithm can determine points along the road that are significant, and sends media files to be displayed when a user approaches these points.

According to some embodiments, media files can be displayed for critical points along a route to a destination. For example, as a user gets closer to a freeway exit, the navigation system can display a photo of the actual lanes before this specific exit and an indicator for which lane to stay in. In some instances, a user can receive multiple media files for different points along the route.

For example, a user can tag locations along a route with media files. Therefore when another user drives along that route, the media files are displayed once the user is within the geofence of the tagged locations.

Another example can include sending a user an itinerary of a scenic route. A user can earmark points of interest and its associated media files. The itinerary can be sent with a link to the media file to allow other users the option to retrieve and display the media files based on the preference of the user. In some instances, users may want to visit only a few locations on the scenic route, and the determination can be based on the media files.

Another example can include directions to a hard-to-find location. In some instances, actual photos illustrating the turns and corners can be displayed. For example, the direction can include turning right after passing a gas station as illustrated by the photo displayed. These media files can be displayed ahead of time to facilitate the user-experience.

According to one embodiment, instead of identifying a location, a user can simply capture a photo that contains geo-tagging information. In this instance, the user-experience can be simplified because it can be one less step a user needs to do. For example, by capturing a series of photos and associating these photos with a photo album, a user can just send access to the photo album to another user. In this example, the mobile device of the other user can display photos when the other user is near the locations geo-tagged on the photo. Alternatively, the media files can be stored in a folder and access to the folder can be sent to the other user. The media files can contain videos (e.g., 360 degree video) and voice commands in addition to images. In some instances, the folder or photo album can be stored on a server (e.g., iCloud).

In some instances, the images can have corresponding audio. For example, as a user drives past a waterfall, the navigation can display a photo of the waterfall and also output a voice command telling the user to look on the right to see the waterfall. In another example, the media file can be an audio tour.

In some instances, the media file can be a video of a location. For example, a user can capture a video of the waterfall using a mobile device, and the application can automatically geotag the location based on the positioning of the mobile device.

According to another embodiment, the media files can help navigate a user when the road map is not fully complete (e.g., roads are not updated on the map). For example, a third-party server may not have captured images of the road in a certain region. In some instances, a user can capture customized media files to help others navigate to a certain location. For example, the media files can be used to customize driving directions by associating and displaying media files when a user reaches certain locations.

According to another embodiment, the driving direction can be customized for error-detection. For example, if the user sees a photo of a certain location that is in the wrong direction, then the user easily knows that he/she has missed the turn.

V. Common Operating System

Mobile devices (e.g., IOS device) that have the same underlining programming language can allow for a better user experience. In some instances, links, plugins, applications, hashtags and certain determiners can be standardized to enhance a user experience.

According to some embodiments, the mobile device can be running a common operating system. For example, the iPhone has a standard map application and the underlining programming language is the same between iPhone. This can facilitate the implementation of transmitting customizable media files associated with a location between users (e.g., iPhone users).

For example, a user can designate a location pin with a home address. In addition, the location pin can be associated with media files. Therefore, when the location pin is shared (e.g., via iMessage) with another user, the media files associated with the location pin are also shared. To illustrate this example, the address can be sent to a user via a text message. The text message can be encapsulated with the media files, a link to retrieve the media files from a server, or another mechanism to receive the media files. The link to the media file can give a user the option to retrieve and display the media files based on the preference of the user.

According to another embodiment, the location and associated media files can be saved as a bookmark. For example, the bookmark can be a component of the vCard.

VI. Mobile Device and Server

Figure 5A:
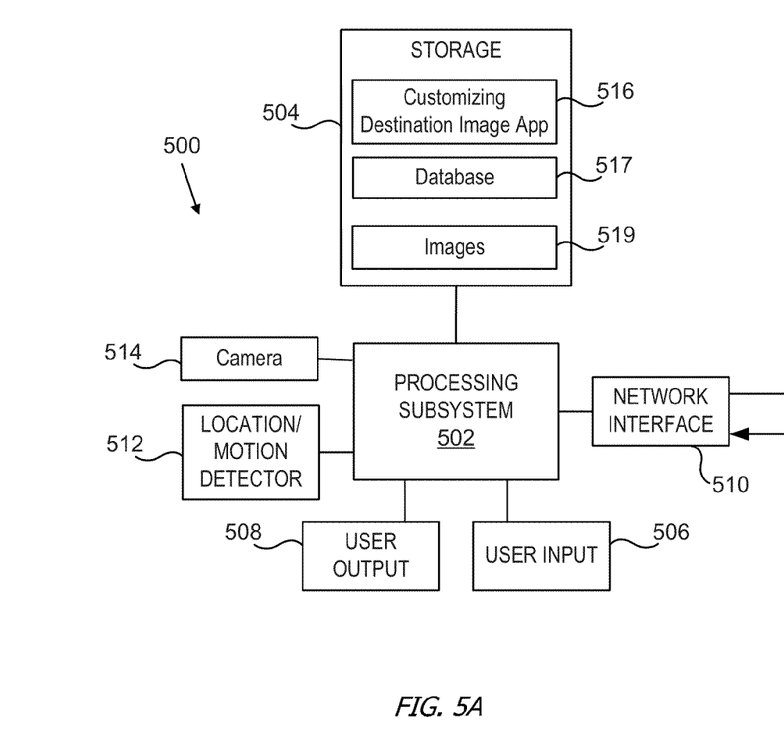
FIG. 5A is a simplified block diagram of an implementation of a device 500 according to an embodiment of the present invention.

FIG. 5A is a simplified block diagram of an implementation of a mobile device 500 according to an embodiment of the present invention. Device 500 can be a handheld device, a notebook computer or any suitable electronic device with a screen for displaying images and that is capable of communicating with a server 550 as described herein. Device 500 includes a processing subsystem 502, a storage subsystem 504, a user input device 506, a user output device 508, a network interface 510, and a location/motion detector 512.

Processing subsystem 502, which can be implemented as one or more integrated circuits (e.g., e.g., one or more single-core or multi-core microprocessors or microcontrollers), can control the operation of device 500. In various embodiments, processing subsystem 502 can execute a variety of programs in response to program code and can maintain multiple concurrently executing programs or processes. At any given time, some or all of the program code to be executed can be resident in processing subsystem 502 and/or in storage subsystem 504. For example, the embodiment illustrated in FIG. 2 can be executed by the processing subsystem 502.

Through suitable programming, processing subsystem 502 can provide various functionality for device 500. For example, processing subsystem 502 can execute a customizing destination images application (or "app") 516. App 516 can perform all or parts of methods described herein, such as obtaining one or more images, a location, accessing database, etc. App 516 can use location information from location/motion detector 512, e.g., as described herein.

Storage subsystem 504 can be implemented, e.g., using disk, flash memory, or any other storage media in any combination, and can include volatile and/or non-volatile storage as desired. In some embodiments, storage subsystem 504 can store one or more application programs to be executed by processing subsystem 502 (e.g., app 516). In some embodiments, storage subsystem 504 can store other data (e.g., used by and/or defined by app 516). For example, database 517 can store media files with associated location information. Programs and/or data can be stored in non-volatile storage and copied in whole or in part to volatile working memory during program execution.

A user interface can be provided by one or more user input devices 506 and one or more user output devices 508. User input devices 506 can include a touch pad, touch screen, scroll wheel, click wheel, dial, button, switch, keypad, microphone, or the like. User output devices 508 can include a video screen, indicator lights, speakers, headphone jacks, or the like, together with supporting electronics (e.g., digital-to-analog or analog-to-digital converters, signal processors, or the like). A user can operate input devices 506 to invoke the functionality of device 500 and can view and/or hear output from device 500 via output devices 508.

Network interface 510 can provide voice and/or data communication capability for device 500. For example, network interface 510 can provide device 500 with the capability of communicating with server 550. In some embodiments network interface 510 can include radio frequency (RF) transceiver components for accessing wireless voice and/or data networks (e.g., using cellular telephone technology, advanced data network technology such as 3G, 4G or EDGE, WiFi (IEEE 802.11 family standards), or other mobile communication technologies, or any combination thereof), and/or other components. In some embodiments network interface 510 can provide wired network connectivity (e.g., Ethernet) in addition to or instead of a wireless interface. Network interface 510 can be implemented using a combination of hardware (e.g., antennas, modulators/demodulators, encoders/decoders, and other analog and/or digital signal processing circuits) and software components.

Location/motion detector 512 can detect a past, current or future location of device 500 and/or a past, current or future motion of device 500. For example, location/motion detector 512 can detect a velocity or acceleration of mobile electronic device 500. Location/motion detector 512 can comprise a Global Positioning Satellite (GPS) receiver and/or an accelerometer. In some instances, processing subsystem 502 determines a motion characteristic of device 500 (e.g., velocity) based on data collected by location/motion detector 512. For example, a velocity can be estimated by determining a distance between two detected locations and dividing the distance by a time difference between the detections. For example, the current location of the mobile device in block 240 of FIG. 2 can be determined using the location/motion detector 512.

A camera 514 can be used to capture the images. Camera 514 can include a lens and an image processor, which can be part of processing subsystem 502. A detected location can be stored with an association to the time period and the one or more images. The images can be stored in an images part 519 of storage 504. For example, the image 110 in FIG. 1A can be captured using camera 514.

Figure 5B:
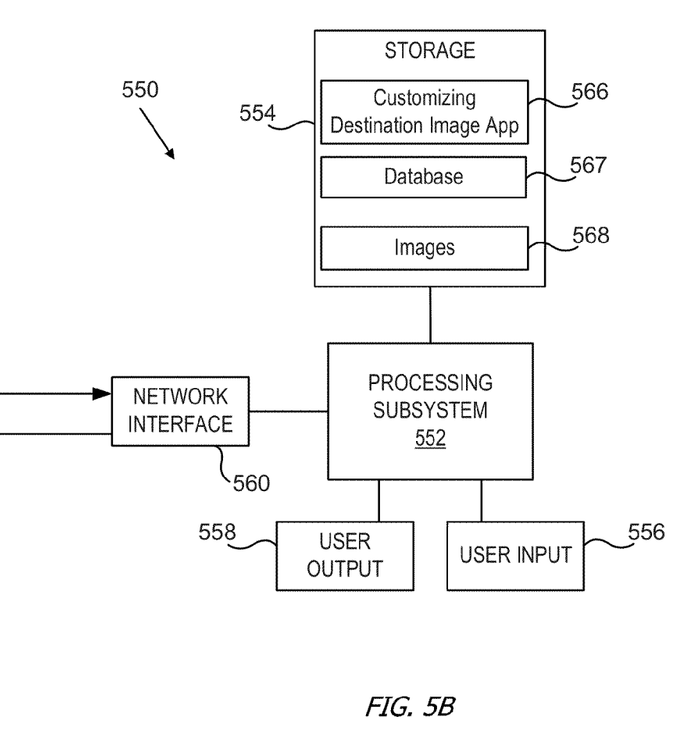
FIG. 5B is a simplified block diagram of an implementation of map server 550 according to an embodiment of the present invention.

FIG. 5B is a simplified block diagram of an implementation of a server 550 according to an embodiment of the present invention. Server 550 may simply receive and forward a conditional communication, determine which device to forward a conditional communication, and/or analyze the conditional communication to determine how and when it is satisfied. Server 550 includes a processing subsystem 552, storage subsystem 554, a user input device 556, a user output device 558, and a network interface 560. Network interface 560 can have similar or identical features as network interface 510 of device 500 described above.

Processing subsystem 552, which can be implemented as one or more integrated circuits (e.g., a conventional microprocessor or microcontroller), can control the operation of server 550. In various embodiments, processing subsystem 552 can execute a variety of programs in response to program code and can maintain multiple concurrently executing programs or processes. At any given time, some or all of the program code to be executed can be resident in processing subsystem 552 and/or in storage subsystem 554.

Through suitable programming, processing subsystem 552 can provide various functionality for server 550. Thus, server 550 can interact with the customizing destination images app 516 (e.g., via customizing destination image app 566) being executed on device 500 in order to provide information from database 567, indications of media files with associated locations, current location of mobile device, and other information mentioned herein. Server 550 can also perform same or similar functionality as device 500.

Storage subsystem 554 can be implemented, e.g., using disk, flash memory, or any other storage media in any combination, and can include volatile and/or non-volatile storage as desired. In some embodiments, storage subsystem 554 can store one or more application programs (e.g., customizing destination image app 566) to be executed by processing subsystem 552. In some embodiments, storage subsystem 554 can store other data, such as images 568 and associated location information in database 567. Programs and/or data can be stored in non-volatile storage and copied in whole or in part to volatile working memory during program execution.

A user interface can be provided by one or more user input devices 556 and one or more user output devices 558. User input and output devices 556 and 558 can be similar or identical to user input and output devices 506 and 508 of device 500 described above. In some instances, user input and output devices 556 and 558 are configured to allow a programmer to interact with server 550. In some instances, server 550 can be implemented at a server farm, and the user interface need not be local to the servers.

The user interface of device 500 can be configured to receive media files with geolocation data to create customizing destination images. The media files can be stored in storage 504 at a server (e.g., server 550). Storage 504 and/or processing subsystem 502 can comprise a storage controller configured to store, in a memory (e.g., storage 504 or storage 554 of server 550), the one or more images with an association to the location. In one embodiment, the storage controller is configured to store the one or more images associated with the location in a memory (e.g., storage 554) on a server in communication with the mobile device. Processing subsystem 502 and/processing subsystem 552 can be configured to display media files associated with a destination once the mobile device reaches the destination.

Either or both storage 504 and storage 554 can include a database that stores media files with associated location information. The processing subsystems 502 and/or 552 can perform methods described herein using information in the database. Databases 517 and 567 may include location information associated with the images 519 and 568.

It will be appreciated that device 500 and server 550 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 500 and/or multiple servers 550, different devices 500 and/or servers 550 can have different sets of capabilities; the various devices 500 and/or servers 550 can be, but need not be, similar or identical to each other.

Further, while device 500 and server 550 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 500 and server 550 are described as singular entities, it is to be understood that each can include multiple coupled entities. For example, server 550 can include a server, a set of coupled servers, a computer and/or a set of coupled computers.

Several illustrative embodiments have been described with respect to the accompanying drawings, which form a part hereof. While particular embodiments, in which one or more aspects of the disclosure may be implemented, are described, other embodiments may be used and various modifications may be made without departing from the scope of the disclosure or the spirit of the appended claims.

It should be understood that any of the embodiments of the present invention can be implemented in the form of control logic using hardware (e.g. an application-specific integrated circuit or field programmable gate array) and/or using computer software with a generally programmable processor in a modular or integrated manner. As used herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media including random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium according to an embodiment of the present invention may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method of providing media on a display of a mobile device of a first user, the method comprising:
   receiving, at the mobile device, a first destination location of the first user;
   receiving, at the mobile device, one or more media files corresponding to the first destination location, wherein at least one of the one or more media files is created with a recording device by a second user associated with the first destination location;
   storing the one or more media files at the mobile device;
   receiving an indicator associating the one or more media files with the first destination location;
   receiving a current location of the mobile device of the first user; and
   automatically sending a request for data of the at least one of the one or more media files to the second user when the current location is within a specified distance of the first destination location.

2. The method of claim 1, wherein the one or more media files comprise one or more of: a photographic image, a sequence of photographic images, a sound recording, and a video.

3. The method of claim 1, wherein the request is sent to the second user by the first user as the first user approaches the first destination location, and wherein an acknowledgment by the second user is necessary prior to receiving the data of the one or more media files.

4. The method of claim 1, wherein the data of the one or more media files is received from the second user.

5. The method of claim 1, wherein the data of the one or more media files is received from a server.

6. The method of claim 1, wherein the data of the one or more media files is displayed when the current location is within the specified distance of the first destination location.

7. The method of claim 1, further comprising:
   receiving a final destination location of the first user, wherein the first destination location is along a route to the final destination location;
   receiving one or more media files of the final destination location, wherein at least one of the media files is created with the recording device;
   receiving an indicator associating the one or more media files with the final destination location; and
   sending data of the one or more media files to the display when the current location is within a specified distance of the final destination location.

8. A method of sending media to a display of a mobile device of a first user, the method comprising:
   receiving and storing one or more media files corresponding to a destination location, wherein at least one of the one or more media files is created with a recording device by a second user associated with the destination location;
   receiving a destination location of the first user;
   sending an indicator associating the one or more media files with the destination location;
   receiving a current location of the mobile device of the first user; and
   automatically sending a request for data of the at least one of the one or more media files to the second user when the current location is within a specified distance of the destination location.

9. The method of claim 8, wherein the one or more media files comprise one or more of: a photographic image, a sequence of photographic images, a sound recording, and a video.

10. The method of claim 8, wherein the one or more media files are generated by the second user associated with the destination location, and wherein a request is sent to the second user by the first user as the first user approaches the first destination location, and wherein an acknowledgment by the second user is necessary prior to sending the data of the one or more media files.

11. The method of claim 8, wherein the data of the at least one of the one or more media files is sent from the second user.

12. The method of claim 8, wherein the data of the one or more media files is sent from a server.

13. The method of claim 8, wherein the data of the one or more media files is displayed when the current location is within the specified distance of the first destination location.

14. A mobile device comprising:
a user interface configured to receive, at the mobile device, a first destination location of a first user;
a recording device for:
creating one or more media files corresponding to the first destination location, wherein at least one of the one or more media files is created by a second user associated with the first destination location; and
storing the one or more media files in memory of the mobile device; and a processing subsystem configured to:
receive an indicator associating the one or more media files with the first destination location;
receive a current location of the mobile device of the first user; and
automatically send a request to the second user for the at least one of the one or more media files when the current location is within a specified distance of the first destination location.

15. The mobile device of claim 14, wherein the one or more media files comprise one or more of: a photographic image, a sequence of photographic images, a sound recording, and a video.

16. The mobile device of claim 14, wherein the one or more media files are generated by the second user associated with the first destination location.

17. The mobile device of claim 14, wherein the request is sent to the second user by the first user as the first user approaches the first destination location, and wherein an acknowledgment by the second user is necessary prior to receiving the data of the one or more media files.

18. The mobile device of claim 16, wherein the data of the one or more media files is received from the second user.

19. The mobile device of claim 14, wherein the data of the one or more media files is received from a server.

20. The mobile device of claim 14, wherein the data of the one or more media files is displayed when the current location is within the specified distance of the first destination location.

21. The mobile device of claim 14, wherein the processing subsystem is further configured to:
receive a final destination location of the first user, wherein the first destination location is along a route to the final destination location;
receive one or more media files of the final destination location, wherein at least one of the media files is created with the recording device;
receive an indicator associating the one or more media files with the final destination location; and
display the one or more media files when the current location is within a specified distance of the final destination location.

22. A mobile device comprising:
a storage controller configured to store, in memory of the mobile device, one or more media files corresponding to a destination location, wherein at least one of the one or more media files is created with a recording device by a second user associated with the destination location; and
a processing subsystem configured to:
receive a destination location of a first user;
send an indicator associating the one or more media files with the destination location; receive a current location of the mobile device of the first user; and
automatically send a request to the second user for the one or more media files when the current location is within a specified distance of the destination location.

23. The mobile device of claim 22, wherein the one or more media files comprise one or more of: a photographic image, a sequence of photographic images, a sound recording, and a video.

24. The mobile device of claim 22, wherein the one or more media files are generated by the second user associated with the destination location, and wherein the request is sent to the second user by the first user as the first user approaches the destination location, and wherein an acknowledgment by the second user is necessary prior to sending the data of the one or more media files.

25. The mobile device of claim 22, wherein the processing subsystem is further configured to upload the data of the one or more media files to a server.

* * * * *